United States Patent [19]
Gelardi

[11] 3,879,829
[45] Apr. 29, 1975

[54] METHOD FOR FORMING LOOPS FROM SPRINGS

[75] Inventor: Joseph T. Gelardi, Yonkers, N.Y.

[73] Assignee: American Technical Industries, Inc., Mount Vernon, N.Y.

[22] Filed: June 3, 1974

[21] Appl. No.: 475,922

[52] U.S. Cl. .................... 29/173; 29/453; 140/102
[51] Int. Cl. ... B21f 15/04; B21f 35/00; B23p 11/02
[58] Field of Search .......... 29/173, 453; 140/88, 89, 140/102, 102.5, 103; 267/167

[56] References Cited
UNITED STATES PATENTS

| | | | |
|---|---|---|---|
| 1,846,257 | 2/1932 | Huck | 267/167 |
| 2,515,629 | 7/1950 | Chambers | 267/167 |
| 2,990,640 | 7/1961 | Burnbaum | 29/453 |
| 3,064,724 | 11/1962 | Nowell | 29/453 |

FOREIGN PATENTS OR APPLICATIONS

| | | | |
|---|---|---|---|
| 1,575,099 | 1/1970 | Germany | 267/167 |

Primary Examiner—C. W. Lanham
Assistant Examiner—E. M. Combs
Attorney, Agent, or Firm—Hopgood, Calimafde, Kalil, Blaustein & Lieberman

[57] ABSTRACT

First and second hook portions at opposite ends of a spring, such as a helical spring, are joined together to form a loop by first inserting a pin into the first hook portion to force it open. Then, a spring bending member moves toward the pin so that the second hook portion of the spring is received in a cavity having curved sidewalls, causing the spring to bend as desired. In this manner, the second hook portion is brought into engagement with the first hook portion, and the pin is then withdrawn to allow the first hook portion to close.

2 Claims, 15 Drawing Figures

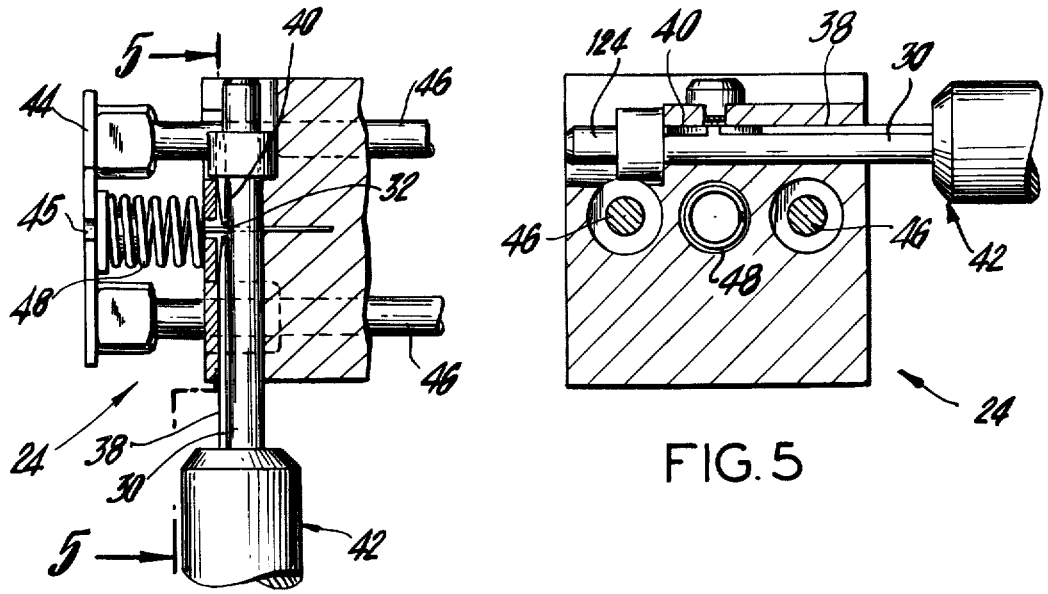
FIG. 4
FIG. 5
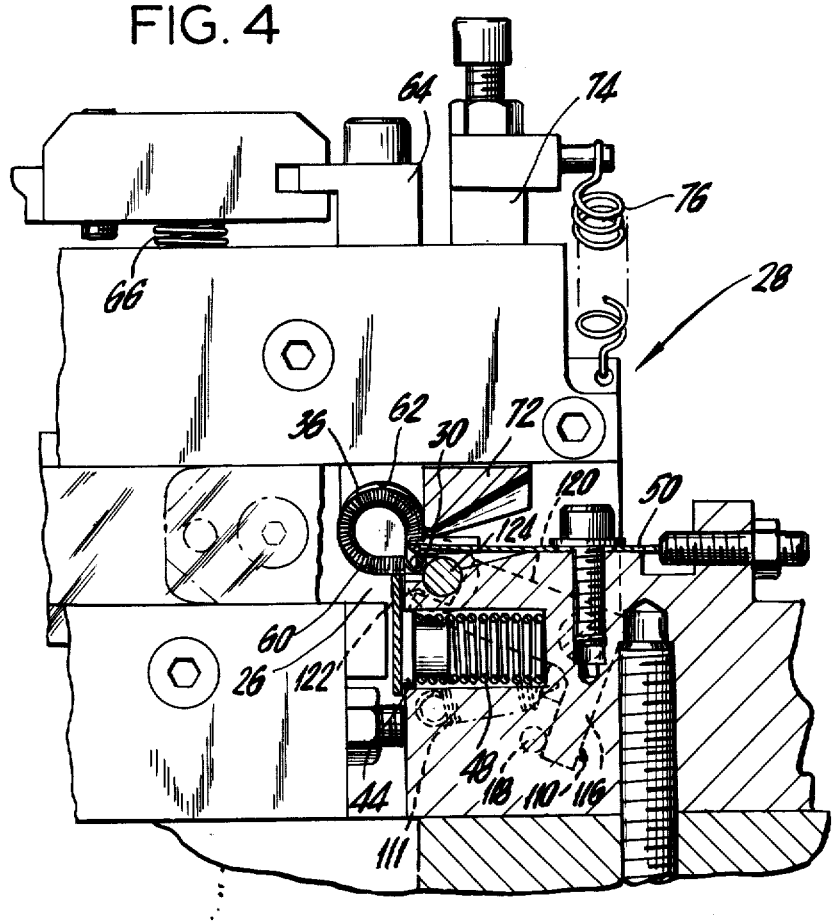
FIG. 6

METHOD FOR FORMING LOOPS FROM SPRINGS

RELATED APPLICATIONS

This is a division of application Ser. No. 379,245 entitled "Apparatus For Forming Loops From Springs," filed on July 16, 1973, now abandoned.

BACKGROUND OF THE INVENTION

The present invention relates to a method for forming loops from helical springs by interlocking hook portions at the opposite ends of the spring.

Springs, such as helical springs, which are bent into the shape of a loop, are used in many manufactured devices. These are often small springs of a type known as garter springs which are manufactured with semi-circular hook portions at their opposite ends. Once the spring is bent into the shape of a loop, one of the hook portions can be inserted into the other so that the spring will retain its looped form.

In the past, loops have been formed from these springs in a manual operation. When the springs are of a small size, this is done with tweezers and sometimes with the aid of a magnifying glass. The work is extremely slow, tiring and tedious.

There is, accordingly, a long felt need for an efficient method for performing the operation of bending a spring from a loop and joining together the hook portions at the ends of the spring.

SUMMARY OF THE INVENTION

One aspect of the present invention is a method for forming a loop from a helical spring having a first and second hook portions at its opposite ends. The method utilizes a pin that can be inserted into the first portion of the spring and a spring bending member defining a cavity for receiving the springs starting with the second hook portion and bending it toward the first hook portion. A guide means controls relative movement between the holding means, which includes the pin, and the spring bending member. The pin may be tapered and reciprocates into and out of engagement with the first hook portion. Thus it can be used to force open the first hook portion which then closes to secure the second hook portion once the pin is removed.

The apparatus may further include a moveable cover having a first position in which it overlies the cavity to prevent sideways removal of the spring therefrom and a second position in which it permits sideways removal. Cover actuating means responsive to relative movement between the spring bending member and the pin may be included. The apparatus may also be provided with injecting means responsive to said relative movement for forcing the spring from the cavity.

Means may be provided for determining whether the first hook portion is properly oriented to receive the second hook portion by detecting an angle between the longitudinal axis of the spring and pin.

Another aspect of the invention pertains to a method for joining the opposite ends of a spring to form a loop by first inserting a pin in a first hook portion at one end of the spring, determining whether the angle between the longitudinal axis of the spring in the pin falls within a predetermined range to indicate whether the first hook portion is properly oriented with respect to the predetermined direction in which the spring is to be bent to bring the first and second hook portions into an interlocked relationship, and rotating the spring 180° about its longitudinal axis if it is not properly oriented. The spring is then bent in said predetermined direction to form the loop with the second hook portion inserted into the first hook portion. The pin is then removed.

BRIEF DESCRIPTION OF THE DRAWINGS

For a more detailed understanding of a preferred embodiment of the invention, reference may be made to the description below, taken in conjunction with the appended drawings wherein:

FIG. 4 is a more detailed top view of the spring holding means of the machine of FIG. 1;

FIG. 5 is a cross-sectional top view of the holding means of the machine of FIG. 1 taken along the line 5—5 of FIG. 4;

FIG. 6 is an enlarged, partially cross-sectional view of the spring bending means and carriage arrangement of the machine of FIG. 1;

DESCRIPTION OF THE PREFERRED EMBODIMENT

Figure 1:
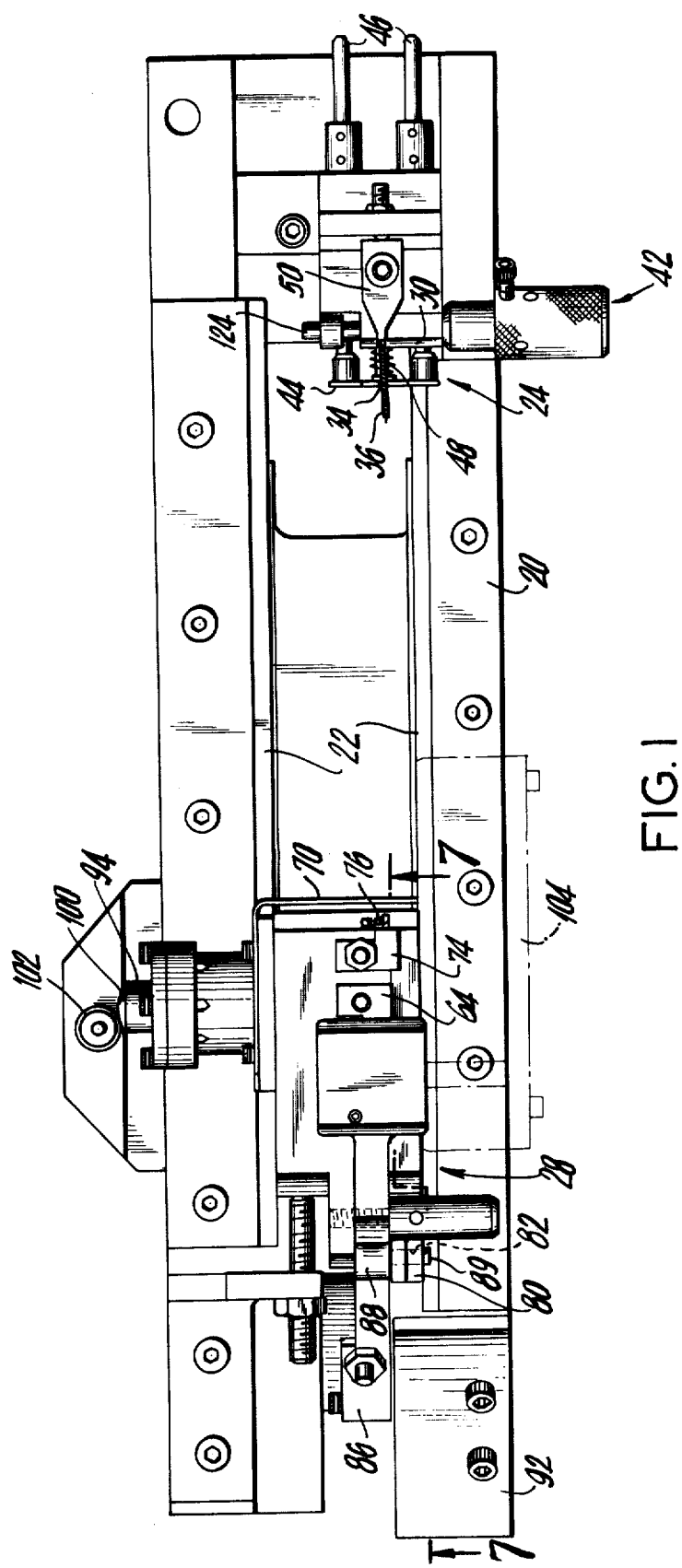
FIG. 1 is a top view of a machine constructed in accordance with the invention.
Figure 2:
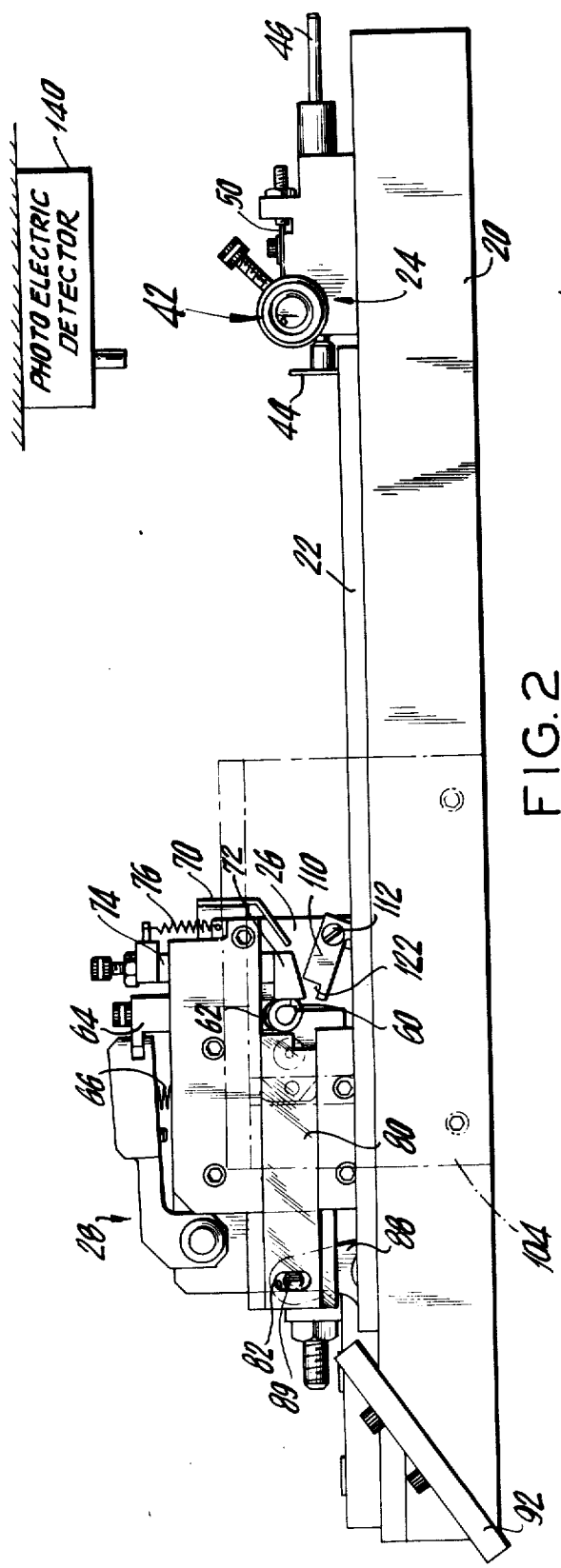
FIG. 2 is a side view of the machine of FIG. 1.

Reference is made first to FIGS. 1 and 2 for an overall view of the apparatus of the invention which includes a base 20, a guide means 22, a spring holding means 24 and a spring bending member 26. The spring bending member 26 is part of a carriage 28 which is slidably moveable along the guide means 22 from a first position shown in FIGS. 1 and 2 into a second position shown in FIG. 3. In its second position, the carriage 28 engages the spring holding means 24.

Figure 9:
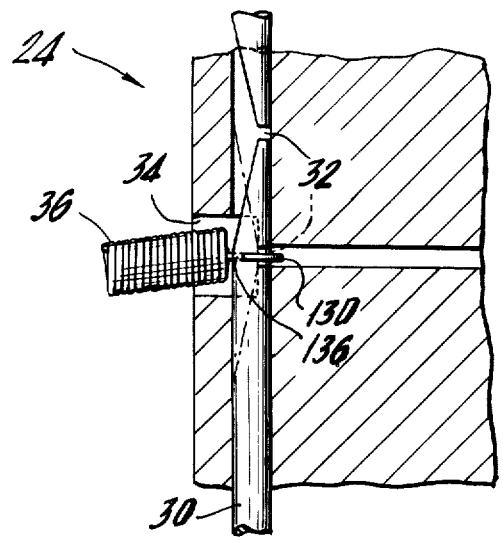
FIGS. 9, 10(a) and 10(b) are cross-sectional views showing top and side elevations of spring engagement by the spring holding means of the machine of FIG. 1.

The spring holding means 24 may be seen more clearly in FIGS. 9 and 4. It includes a tapered reciprocative pin 30 capable of movement between a first position shown in broken lines of FIG. 9 and a second position shown there in solid lines. In the first position, a gap 32 between two tapered portions of the pin is aligned with a centrally disposed spring receiving slot 34. In its second position, the pin 30 engages the spring 36 about its full untapered diameter in a manner explained below in connection with the operation of the machine.

As shown most clearly in FIG. 4, the pin 30 has two separate portions 38 and 40, each of which is tapered toward the gap 32. Both portions 38 and 40 of the pin 30 are supported by a structure 42 which reciprocates with the pin. A cross-section of the apparatus of FIG. 4 taken along the line 5—5 is shown in FIG. 5.

FIG. 4 also shows a plate 44 which absorbs shock as the carriage 28 engages the spring holding means 24. The plate 44 is supported by two reciprocative shafts 46 and biased toward the carriage 28 by a coil spring 48 and has a V-shaped notch 45 which engages the underside of the spring 36 to center and axially position it. Thus, the plate 44 functions as a bumper and as a spring positioning means.

Figure 11:
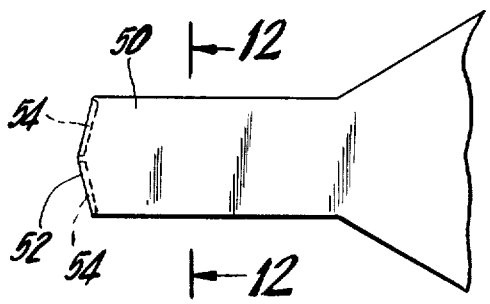
FIG. 11 shows a fragmented top elevation of a spring guide included in the machine of FIG. 1.
Figure 12:
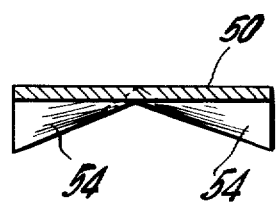
FIG. 12 is a cross-sectional side view of the guide of FIG. 11 taken along the line 12—12.

The spring holding means 24 includes a flexible plow shaped spring guiding member 50. A fragmented top view of this spring guiding member is shown in FIG. 11. Its leading end 52 forms a broad V so that the guide 50 has the greatest length at its center. The leading edge 52 is bent downwardly as shown in the sectional view of FIG. 12 taken along the line 12—12 of FIG. 11. The down-turned portion forms two triangular spring guides 54 tapered toward its center which prevent the guide 50 from being inserted between the turns of the spring 36.

Figure 7:
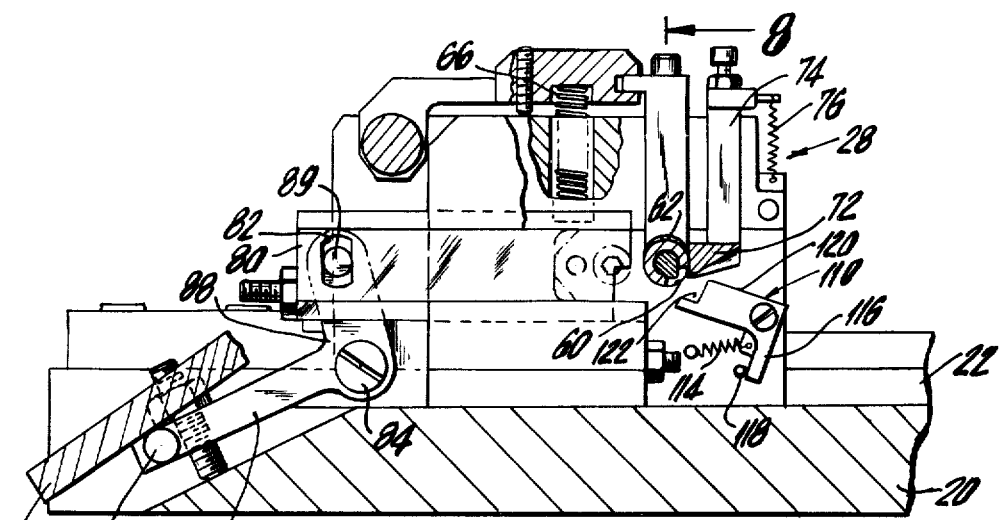
FIG. 7 is an enlarged view of the carriage and cover actuating means taken along the line 7—7 of FIG. 1.

The carriage 28 is shown by FIG. 7 in a fragmentary cross-sectional view taken along the line 7—7 of FIG. 1. Further details are shown in FIG. 6 which is an enlargement of a portion of FIG. 3. The spring bending member 26 defines a spring receiving cavity 60 having curved side walls in which the spring 36 is bent into the shape of a loop as shown in FIG. 6. The uppermost wall 62 of the cavity 60 is formed by a reciprocative member 64 which is biased downwardly by a spring 66.

The carriage 28 includes a spring directing plate 70 and a final guide means 72. The final guide means 72 presents a three-dimensional surface which directs the spring 36 toward the channel 60. The surface 72 is movably supported on the end of a shaft 74 which is urged toward the base 20 by a low-tension spring 76.

Figure 3:
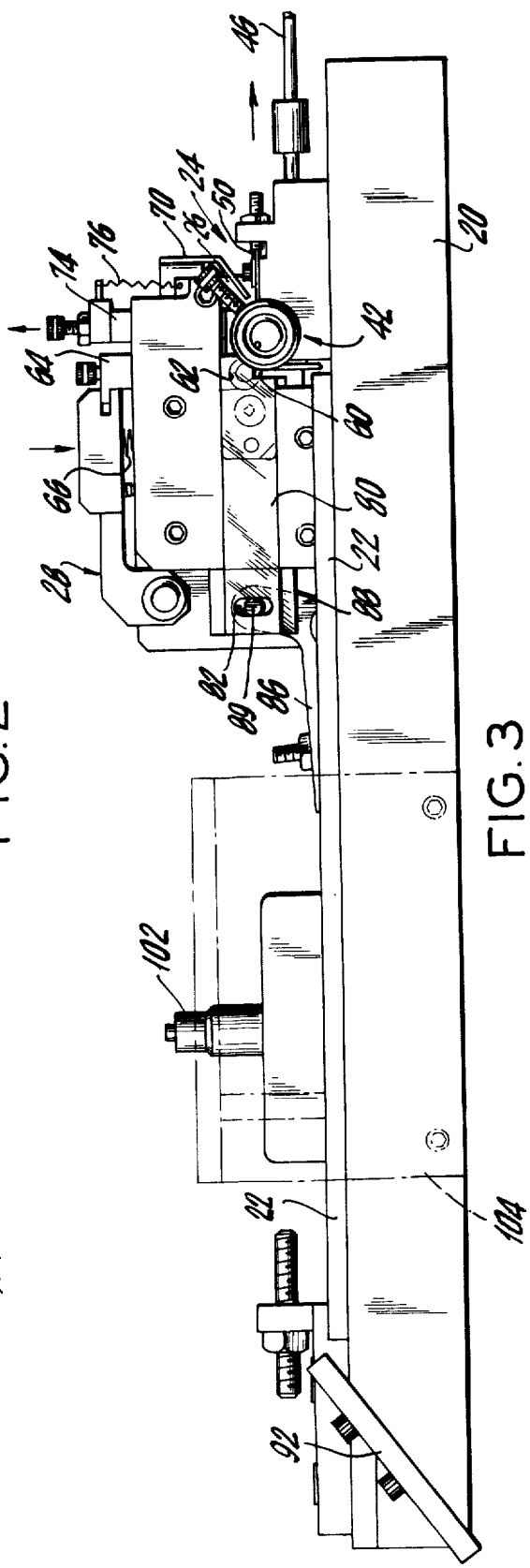
FIG. 3 is a side view of the machine of FIG. 1 with its carriage occupying a different position.

The carriage 28 further includes a moveable cover 80 which has a first position shown in FIG. 3, in which it overlies the cavity 60 to prevent sideways removal of the spring 36 therefrom, and a second position shown in FIG. 2, in which it permits sideways removal of the spring 36. The position of the cover 80 is controlled by a slot 82 in the cover, which is engaged by a cover actuating means responsive to relative movement between the spring bending member 26 and the pin 30 along the guide means 22.

The cover actuating means is shown most clearly in FIG. 7. It includes a member made up of two arms 86 and 88 and pivotable about a shaft 84. The arm 86 carries a projection 90 which engages a cover actuating guide 92 attached to the base 20 at an angle to the guide means 22. The arm 88 carries a pin 89 thereon which engages the slot 82.

Figure 8:
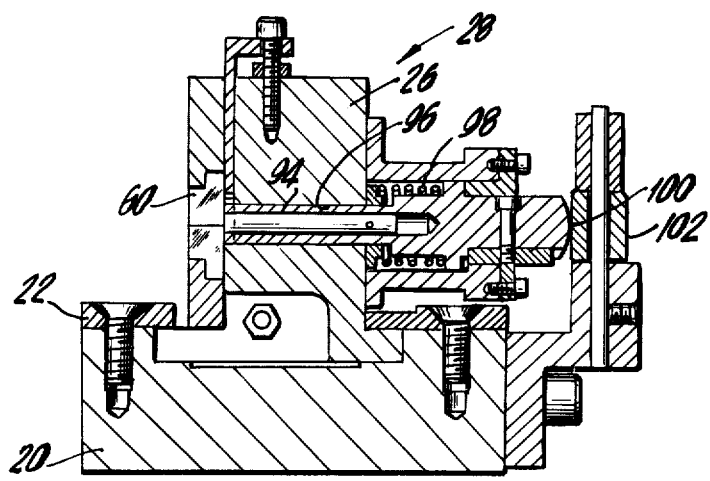
FIG. 8 is a cross-sectional view taken along the line 8—8 of FIG. 7, showing the spring ejecting means of the machine of FIG. 1.

The carriage 28 further includes ejecting means for removing the spring 36 from the cavity 60, this ejecting means being responsive to relative movement between the spring bending member 26 and the pin 30. The ejecting means includes an ejecting member 94 reciprocatively disposed within a channel 96 in the spring bending member 26. The ejecting member 94 is biased by a coil spring 98 toward a position in which it does not project into the cavity 60. However, when a force is applied to the external dome shaped end 100 of the ejecting member 94, this movement moves against the force of the spring 98 into the cavity 60, thereby forcing the spring 36 (not shown in FIG. 8) out of the cavity 60. A roller 102 which functions as a cam is positioned along the guide means 22 to engage the ejected member 94, thus forcing it into the cavity 60 when the carriage 28 occupies the position shown in FIG. 1.

A transparent plastic shield 104 is attached to the base 20 so that it stands opposite the cavity 60 when the carriage 28 occupies its first position shown in FIG. 1 to prevent loss of the spring 36 when it is ejected from the cavity 60. The shield 104 is shown in phantom lines to render the drawings more clear.

The apparatus further comprises a latching means for preventing relative movement between the spring bending member 26 and the pin 30 away from the mutually engaging second position of FIG. 3 until after the pin 30 has been withdrawn from the position shown in solid lines in FIG. 9 to the position shown in broken lines. This latching means includes a latch member 110 pivotable about a shaft 112 and biased by a spring 114 toward a position in which an arm 116 of the member 110 engages a stop 118. The top surface 120 of the latch member 110 is normally inclined with respect to the guide means 22 as the carriage 28 is moved to position shown in FIGS. 3 and 6 in which a notch 122 in the member 110 engages a shaft 124 which forms part of the supporting structure 42 for the pin 30. The shaft 124 is, however, disengaged from the notch 122 to permit relative movement of the carriage 28 and spring bending member 26 once the pin 30 has been moved to its first position shown in broken lines in FIG. 9 in which it does not engage the spring 36.

Figure 13:
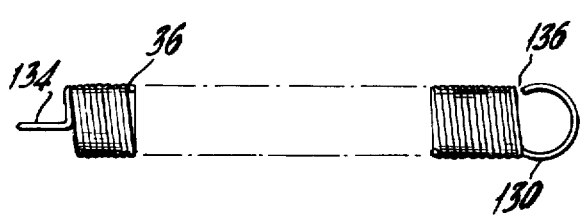
FIGS. 13 and 14 show a spring, on which the machine of FIG. 1 is intended to operate, in its unlooped and looped configurations, respectively.
Figure 14:
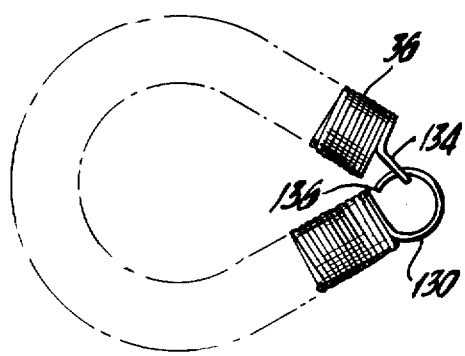

The spring 36 on which the apparatus of this invention is designed to operate is shown, in a fragmented view, in FIG. 13 in its unlooped form. This is a helical spring having a generally semi-circular first hook portion 130 at one end and a similar second hook portion 134 at its opposite end. In FIG. 14, the spring 36 of FIG. 13 is shown after it has been bent to form a loop with the first and second hook portions 130 and 134 in a mutually interlocking relationship.

The method of the invention and the operation of the spring looping apparatus described above begins with the carriage 28 occupying its first position, in which it does not engage the pin 30 or the spring holding means 24. The pin 30 and its supporting structure 24 are moved to the position shown in broken lines in FIG. 9 with the pin gap 32 aligned with the spring receiving slot 34. Then the first hook portion 130 of the spring 36 is inserted through the gap 32 oriented such that its open end 136 faces upwardly away from the guide means 22 and the base 20. Thus the open end 136 of the first hook portion 130 can receive the second hook portion 134 when the spring 36 is bent upwardly and around so that it forms a loop.

The pin 30 is then moved to its second position, shown in solid lines in FIG. 9, so that the tapered portion of the pin 30 adjacent the gap 32 is forced through the first hook portion 130. This tapered portion is dimensioned so that when inserted into the first hook portion 130 to the extent of its full diameter, it forces the hook portion 130 to separate slightly so that it can receive the second hook portion 134.

The springs 36 are often of such small size that it is difficult to determine with the naked eye when the first hook portion 130 is properly oriented with its open end 136 facing upwardly. However, use is made of the fact that the end surface of a helical spring forms an oblique angle with the longitudinal axis of the spring because of the manner in which the spring is wound. Therefore, when the spring 36 is properly oriented and engaged by the pin 130 with the open end 136 facing upwardly, the spring 36 is not perpendicular to the pin but is angled toward the shield 104 and away from the cam 102. If, however, the spring 36 were improperly oriented with the open end 136 facing downwardly, the spring 36 would be angled in the opposite direction pointing slightly toward the cam 102. Thus, an operator can readily determine with the naked eye whether the spring 36 is properly oriented after it is engaged by the pin 30. If it is found that the spring 36 is angled in the wrong direction, it is removed from the pin 30, rotated 180° about its longitudinal axis and re-engaged by the pin 30.

The determination of whether the spring 36 is properly oriented once engaged by the pin 30 can be made by a photoelectric detector 140 that senses the presence or absence of a spring in a predetermined position. This detector 140 can be arranged to actuate an indicator to bring the improper condition to the operator's attention, or the detector 140 can cause automatic operation of the apparatus to correct the condition by, for instance, causing the pin 30 to rotate end over end.

Figure 10A:
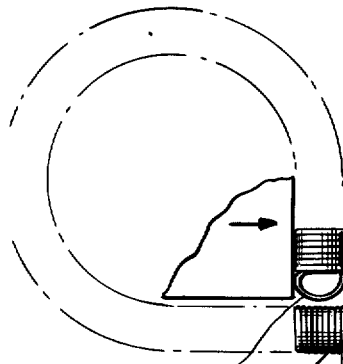
Figure 10B:
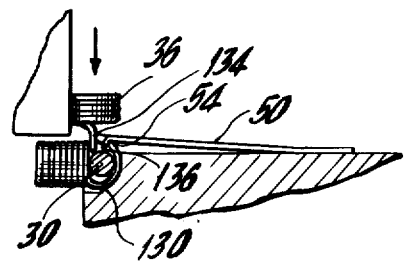

Once the spring 36 has been properly engaged by the pin 30 of the spring holding means 24, the carriage 28 including the spring bending member 26 is moved along the guide means 22 to the position shown in FIG. 3. As the carriage 28 approaches the pin 30, it first engages the guide plate 70. It is then engaged by the notch 45, the surface 72 of the final guide means, thus directing the spring 36 into the cavity 60. The spring 36 follows upwardly along the wall of the cavity 60 furthest from the pin 30 until the second hook portion 134, which is the first part of the spring 36 to enter the cavity 60, is bent around under the surface 62 toward the first hook portion 130 as shown, in FIG. 10(a). The hook 134 has a random angular orientation with respect to the hook 130. The plow shaped guide 50 rotates the hook 134 until it is perpendicular to the hook portion 130 as shown in FIG. 10(b). Then the second hook portion 134 passes through the separated openable end 136 of the first hook portion 130. This openable end 136 may have a normally separated position providing an opening for the second hook portion 134. Preferably, however, the openable end 136 has a normally closed position and is separated by the presence of the pin 30.

As the carriage 28 continues to engage the supporting structure 42 of the pin 30, the shock is partially absorbed by the plate 44. At the same time, the trailing edge of the surface 120 of the latch member 110 is pressed downwardly by the shaft 124. When engagement is complete, the member 110 returns to its normal position under the force of the spring 114 with the shaft 124 engaged by the notch 122 at the trailing end of the member 110. In this way, the latching means prevents the carriage 28 and the spring bending member 26 from being moved away from the pin 30 until after the pin 30 has been withdrawn to the position shown in broken lines in FIG. 9. This retraction of the pin 30 moves the shaft 124 out of engagement with the notch 122 to permit retraction. At the same time, the movement of the pin 30 disengages the first hook portion 130 of the spring 36, allowing the openable end 136 to return to its normal position. Then, with the gap 32 aligned with the spring receiving slot 34 and the notch 122 disengaged from the shaft 124, the now looped spring 36 is held in the cavity 60. If the operator were to attempt to move the spring bending member 26 relative to the pin 30 along the guide means 22 without first withdrawing the pin 30 from the first hook portion 130 of the spring 36, the latching means would prevent this movement and thus prevent damage to the spring 36.

As the spring bending member 26 and the rest of the carriage 28 are moved along the guide means 22 relative to the pin 30, the spring 36 is prevented from moving sideways out of the cavity 60 by the cover 80. However, as the carriage 28 again reaches the position shown in FIG. 2, the projection 90 and guide 92, which form part of the cover actuating means, cause the arms 86 and 88 to pivot about the pin 84, thus moving the cover 80 away from the cavity 60. This permits the spring 36 to be ejected sideways from the cavity 60 when the ejecting member 94 is forced into the cavity 60 by engagement with the roller cam 102. After ejection, a new spring 36 is inserted in the holding means 24 and the operation is repeated.

This invention should not be deemed limited to the specific arrangements described herein, as many additional variations and modifications thereof will occur to those skilled in the art. The scope of the invention is not limited except by the appended claims.

I claim:

1. A method for joining the opposite ends of a spring to form a loop by interlocking first and second hook portions attached at opposite ends of the spring comprising:

inserting a pin in the first hook portion;
   determining whether the angle formed between the longitudinal axis of the spring and the pin falls within a predetermined range to indicate whether the first hook portion is properly oriented with respect to a predetermined direction in which the spring is to be bent to bring the first and second hook portions into an interlocked relationship;
   rotating the spring 180 degrees about its longitudinal axis if it is not properly oriented;
   bending the spring in said predetermined direction to form a loop with the second hook portion inserted into the first hook portion; and
   removing the pin from the first hook portion.

2. The method of claim 1, wherein a pin is used which is tapered and dimensioned so that when inserted it forces the first hook portion from a normally closed position to an open position to receive the second hook portion in said interlocking relationship.

* * * * *